UNITED STATES PATENT OFFICE.

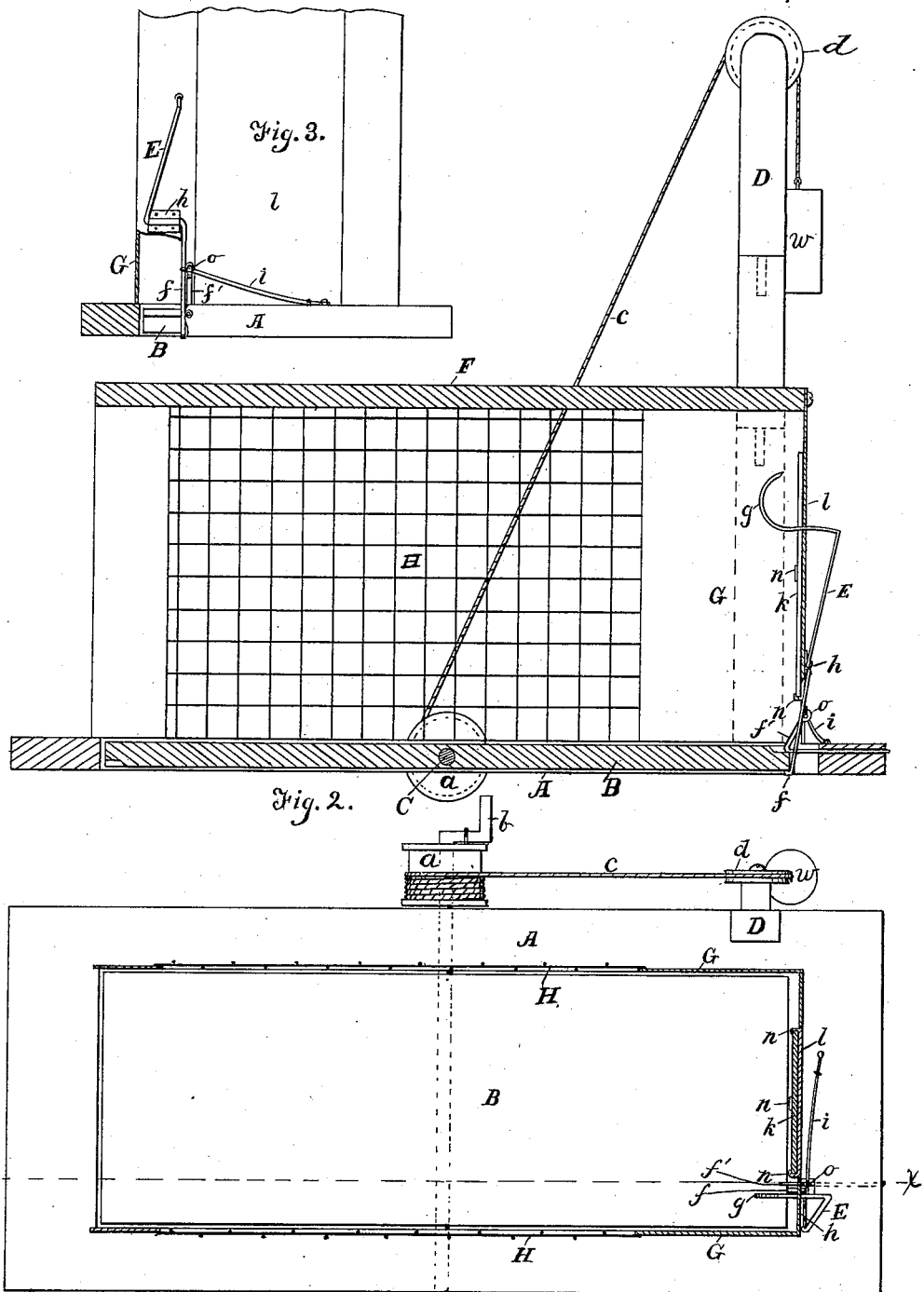

JAMES L. ANDERSON, OF GRAND RAPIDS, MICHIGAN, ASSIGNOR OF ONE-HALF TO WORDEN B. MASON, OF SAME PLACE.

RAT-TRAP.

SPECIFICATION forming part of Letters Patent No. 352,902, dated November 16, 1886.

Application filed March 15, 1886. Serial No. 195,371. (No model.)

*To all whom it may concern:*

Be it known that I, JAMES L. ANDERSON, a citizen of the United States, residing at Grand Rapids, in the county of Kent and State of Michigan, have invented certain new and useful Improvements in Rat-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a plan view, top removed. Fig. 2 is a side view on line X X of Fig. 1. Fig. 3 is a rear end view showing lower portion of bait-spring.

Similar letters refer to similar parts.

My invention relates to improvements in rat-traps wherein the bottom of trap is made to revolve by operation of weight and pulley.

The object of my invention is to drop the animal into a pail of water or other receptacle below and leave trap reset for another capture.

I describe my invention in detail as follows:
Referring to the drawings, A represents bottom frame of trap, which consists of a box or casing open at one end, within which is the floor B, rigidly hung on the shaft C, which is extended through the frame on one side, forming the axis of drum $a$, and terminating in the crank $b$. The post D, made in sections for facility in shipment, has the pulley $d$ at the top. The rope $c$, fastened to the drum $a$, passes over said pulley and holds suspended the weight $w$.

F is the top of trap, G the closed portion of side, and H the wire portion of same. The back end is shown as $l$.

The floor B is held in horizontal position by the catch $f$ on the under side, and the catch $f'$ on the upper side. The catch $f$ is the lower end of the rod E, the rod passing through the back of the trap, where it is bent at right angles through the pivot-socket $h$, and thence passes upward and through to inside of trap, where it terminates in the bait-hook $g$. It is held in position by the spring $i$, which also operates the upper catch, $f'$, which consists of a wire bent in the form of a knee, the lower end passing backward through frame of trap and the upper end terminating in the eye $o$, through which said spring passes.

Upon the inner end of said trap is hung the mirror $k$, held by the claws $n$ $n$, the object of which is to entice the animal into the trap by the sight of its own likeness.

It will be seen that, the trap being set by the winding up of the weight and baited, any pulling at the bait will disengage the catch $f$, and the floor B will reverse ends, the back end dropping.

I am aware that traps having tilting or revolving floors are not novel.

What I claim, and desire to secure by Letters Patent of the United States, is—

In a rat-trap, the combination of the bottom frame, A, having the pivoted floor B, the drum mounted on the shaft of the floor, a journaled pulley, a weighted rope secured to the drum and passing over the pulley, the pivoted rod E, bent to form a hook at its upper end and bent inwardly at its lower end to engage the under side of the floor to support it, the catch $f'$, bent inwardly to engage the upper side of the floor and bent at its upper end to form an eye, and a spring, $i$, passing through the eye $o$ and bearing against the catch $f$, substantially as set forth.

In testimony whereof I affix my signature in presence of two witnesses.

JAMES L. ANDERSON.

Witnesses:
WM. A. CHAPMAN,
ADOLPH B. MASON.